(12) United States Patent
Wimmer

(10) Patent No.: US 8,527,652 B2
(45) Date of Patent: Sep. 3, 2013

(54) INTER-BAY SUBSTATION AUTOMATION APPLICATION

(75) Inventor: Wolfgang Wimmer, Rietheim (CH)

(73) Assignee: ABB Technology AG, Zurich (CH)

( * ) Notice: Subject to any disclaimer, the term of this patent is extended or adjusted under 35 U.S.C. 154(b) by 512 days.

(21) Appl. No.: 12/817,916

(22) Filed: Jun. 17, 2010

(65) Prior Publication Data

US 2010/0325304 A1 Dec. 23, 2010

(30) Foreign Application Priority Data

Jun. 17, 2009 (EP) .................................... 09162906

(51) Int. Cl.
*G06F 15/16* (2006.01)

(52) U.S. Cl.
USPC .............................. 709/232; 702/57; 700/292

(58) Field of Classification Search
USPC ......................................................... 709/232
See application file for complete search history.

(56) References Cited

U.S. PATENT DOCUMENTS

| | | | |
|---|---|---|---|
| 4,767,941 A | 8/1988 | Brand et al. | |
| 7,945,400 B2 * | 5/2011 | Hou ................. | 702/58 |
| 2002/0059477 A1 | 5/2002 | Wimmer et al. | |
| 2009/0070051 A1 * | 3/2009 | Vetter et al. ..................... | 702/57 |
| 2009/0070062 A1 * | 3/2009 | Kirrmann et al. ............. | 702/122 |
| 2009/0281674 A1 * | 11/2009 | Taft ............................... | 700/286 |

FOREIGN PATENT DOCUMENTS

| | | |
|---|---|---|
| EP | 1 191 662 A | 3/2002 |
| EP | 1 850 109 A | 10/2007 |

OTHER PUBLICATIONS

European Search Report for EP 09162906.3 dated Mar. 1, 2010.
Y. Wu et al., "Research on On-line Interlocking of Substation Operation on Wide Area Security Defense," Sustainable Power Generation and Supply, 2009, Supergen '09, International Conference on, IEEE, Apr. 6, 2009, pp. 1-4.
S. Mohagheghi et al., "Communication Protocols and Networks for Power Systems—Current Status and Future Trends," Power Systems Conference and Exposition, Mar. 15, 2009, pp. 1-9.
A. Apostolov et al., "Use of IEC 61850 Object Models for Power System Quality/Security Data Exchange," Quality and Security of Electric Power Delivery Systems, CIGRE/IEEE PES International Symposium, Oct. 8-10, 2003, pp. 155-164.
K-P. Brand et al., "Investigations of Different Function Allocations in SA Systems enabled by IEC 61850," Power Tech, Jul. 1, 2007, pp. 720-725.
T. Xu et al., "Bay Level IED Modeling and Realizing using IEC 61850," Transmission and Distribution Conference and Exposition, Apr. 21, 2008, pp. 1-7.

(Continued)

*Primary Examiner* — Hamza Algibhah
(74) *Attorney, Agent, or Firm* — Buchanan Ingersoll & Rooney PC

(57) ABSTRACT

The present disclosure is directed to an exemplary interface description or structure of an inter-bay Substation Automation (SA) application. The interface of the application to other elements of the SA system, for example to a bay controller, IED, OPC server, HMI, and/or gateway, is examined to fully automate the inter-bay SA application configuration and implementation. A formal description or structure of the base SA system as for example, including an IEC 61850 SCD file can be used to generate a formal description of the interfaces of the inter-bay SA application to be engineered. Logical nodes can be connected to the process single line diagram and integrated into the SCD file of the base SA system, thereby generating an enhanced SCD file.

6 Claims, 3 Drawing Sheets

(56) References Cited

OTHER PUBLICATIONS

K-P Brand, "The Standard IEC 61850 as Prerequisite for Intelligent Applications in Substations," Power Engineering Society General Meeting, Jun. 6, 2004, pp. 714-718.

B. Kasztenny et al., "IEC 61850—A Practical Application Primer for Protection Engineers," Power Systems Conference: Advanced Metering, Protection, Control, Communication, and Distributed Resources, Mar. 1, 2006, pp. 18-50.

V. Flores et al., "Case Study: Design and Implementation of IEC 61850 From Multiple Vendors at CFE La Venta II," Protective Relay Engineers, 60th Annual Conference, Mar. 1, 2007, pp. 307-320.

A. Apostolov, "Communications in IEC 61850 Based Substation Automation Systems," Power Systems Conference: Advanced Metering, Protection, Control, Communication and Distributed Resources, Mar. 1, 2006, pp. 51-56.

* cited by examiner

INTER-BAY SUBSTATION AUTOMATION APPLICATION

RELATED APPLICATIONS

This application claims priority under 35 U.S.C. §119 to European Patent Application No. 09162906.3 filed in Europe on Jun. 17, 2009, the entire content of which is hereby incorporated by reference in its entirety.

FIELD

The disclosure relates to the field of Substation Automation (SA) systems with a standardized configuration representation, and to a method of implementing an inter-bay SA application controlling primary devices arranged in a plurality of substation bays of a power system.

BACKGROUND INFORMATION

Substations in high and medium-voltage power networks include primary devices, such as electrical cables, lines, bus bars, switches, power transformers and instrument transformers, which can be arranged in switch yards and/or bays. These primary devices can be operated in an automated way via a Substation Automation (SA) system. The SA system includes secondary devices, among which Intelligent Electronic Devices (IED) can be responsible for protection, control and monitoring of the primary devices. The secondary devices can be hierarchically assigned to a station level or a bay level of the SA system. The station level can include a supervisory computer including an Operator Work Station (OWS) with a Human-Machine Interface (HMI) and running a station-level Supervisory Control And Data Acquisition (SCADA) software, as well as a gateway that communicates the state of the substation to a Network Control Centre (NCC) and receives commands from it. IEDs on the bay level, also termed bay units, in turn can be connected to each other as well as to the IEDs on the station level via an inter-bay or station bus that can exchange commands and status information.

A communication standard for communication between the secondary devices of a substation has been introduced by the International Electrotechnical Committee (IEC) as part of the standard IEC 61850 entitled "Communication Networks and Systems in Substations." For non-time critical report messages, section IEC 61850-8-1 specifies the Manufacturing Message Specification (MMS, ISO/IEC 9506) protocol based on a reduced Open Systems Interconnection (OSI) protocol stack with the Transmission Control Protocol (TCP) and Internet Protocol (IP) in the transport and network layer, respectively, and Ethernet and/or RS-232C as physical media. For time-critical event-based messages, such as trip commands, IEC 61850-8-1 specifies the Generic Object Oriented Substation Events (GOOSE) directly on the Ethernet link layer of the communication stack. For fast periodically changing signals at the process level, such as measured analogue voltages or currents, section IEC 61850-9-2 can specify the Sampled Value (SV) service, which like GOOSE builds directly on the Ethernet link layer.

SA systems based on IEC61850 can be configured by a standardized configuration representation or formal system description called Substation Configuration Description (SCD). An SCD file can include the logical data flow between the IEDs on a "per message" base, for example, for every message source, a list of destination or receiver IEDs, the message size in terms of data set definitions, as well as the message sending rates for all periodic traffic like reports, GOOSE, and SV.

Substation Automation (SA) systems can include a number of basic SA functions for protection, control and monitoring of the substation. These functions can relate to individual pieces of primary equipment or to entire substation bays. In addition, higher-level applications can be provided, which involve at least a station level operator HMI and/or the connection to a remote operation place or network control center by a gateway. Applications can be used as operator support or for automating handling of emergency situations within the station. They can involve operational information from more than one piece of primary equipment, even from more than one bay, and hence are termed "inter-bay", "station-level", or "distributed." In addition to a possible primary functional or operational goal, a configuration of such inter-bay applications therefore can also rely on the dynamic switchyard configuration or topology, as well as the basic SA functions used to gather data from the switchyard and execute commands on it. Inter-bay functions can be station-level interlocking, station and bay level switching sequences, transformer parallel control, transformer auto close functions and load shedding.

Inter-bay functions can be engineered or implemented on top of an existing SA system. The latter can provide the process state information and some means to control the process. This engineering can be done manually, by instantiating the needed function blocks and connecting them signalwise to the existing SA system. For some station-level functions, for example switching sequences, even a complete new IED may be used, including dedicated, and hence at least partly duplicated, wiring or cabling to the switch yard.

According to the patent application EP-A 1191662, an engineering wizard for an SA function can automatically generate the data flow between IEDs and a function configuration, based on known switchgear parameter values and function block allocation to the switchgear as obtained from a Substation Configuration Description. For example, the configuration of a first SA function can involve allocating this function to a primary device and an IED. Following this, a primary device model and a topology model can be used to automatically determine second, more basic, SA functions, of which data or procedures are used by the first SA function during operation. If desired, the corresponding communication links between the first SA function and the second SA functions can be determined automatically on the basis of a communication model.

According to the U.S. Pat. No. 4,767,941, the implementation of interlocking functionality can be automated based on an actual topology of the substation, for example the actual switching states of all switching devices, and based on an exhaustive set of rules for interlocking operation. Decoupling the topological configuration of the substation from the interlocking rules can allow updating each of them independently and thus can increase flexibility. The signals that indicate the switching state of the associated switching devices can be supplied via dedicated data buses and data links to a centralized data acquisition and processing unit. By evaluating the signals the actual topology of the substation can be inferred, and based on the interlocking rules, a release pattern can be determined and stored. The latter indicates a release or blocking property for each switching device, for example if a specific switching operation request command is to be accepted or refused.

In the context of the present disclosure, an inter-bay SA application can be understood to involve and coordinate substation primary devices arranged in a plurality of substation bays and defining a coordination range corresponding to a particular voltage level within a substation, a single substation, or a plurality of substations.

SUMMARY

A method is disclosed for implementing an inter-bay Substation Automation SA application involving primary devices (QA1, QE1) arranged in a plurality of substation bays (Q2, Q3, Q4), which includes reading a standardized configuration description of an SA system of a substation, and obtaining therefrom a static topology of the substation as well as primary device information, generating a coordination function block (LLN0, GAPC1) for control of the inter-bay SA application, and assigning, in the standardized configuration description of the SA system, the coordination function block to a coordination-level above a bay level, and generating an interface function block (QA1CILO3; QE3CILO1, GAPC1) for exchanging, over an SA communication network, data related to a substation constituent (QA1, QE1; Q2, Q3, Q4), and assigning, in the standardized configuration description of the SA system, the interface function block to an interface-level respective of the substation constituent.

An Intelligent Electronic Device IED of a Substation Automation SA system is disclosed for connecting to an SA communication network for data exchange with other IEDs, and hosting, which includes a coordination function block (LLN0, GAPC1) for control of an inter-bay Substation Automation SA application involving primary devices (QA1, QE1) arranged in a plurality of substation bays (Q2, Q3, Q4), the coordination function block being assigned, in a standardized configuration description of the SA system, to a coordination-level above a bay level, and an interface function block (QE3CILO1, GAPC1) for exchanging, over the SA communication network, data related to a substation constituent (QA1, QE1; Q2, Q3, Q4), the interface function block being assigned, in the standardized configuration description of the SA system, to an interface-level respective of the substation constituent.

BRIEF DESCRIPTION OF THE DRAWINGS

The subject matter of the disclosure will be explained in more detail in the following text with reference to exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION

Figure 1:
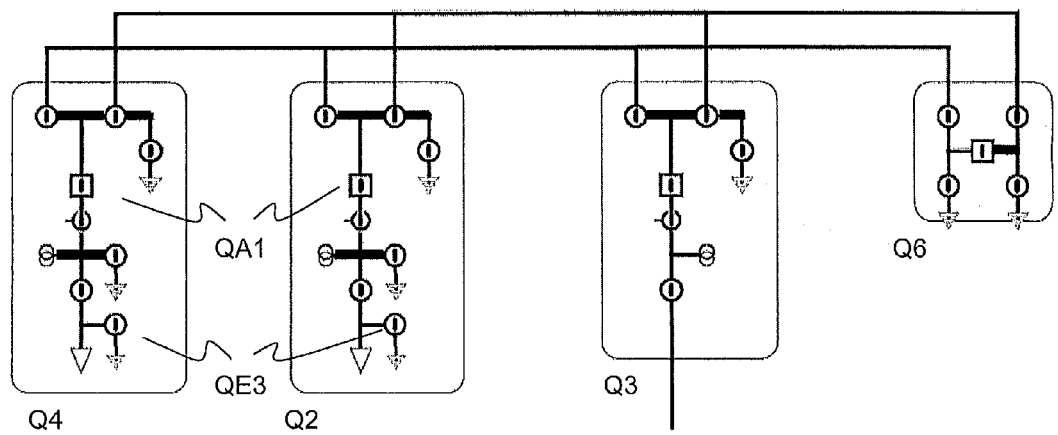
FIG. 1 depicts a single line diagram of an exemplary substation with double busbar and three bays.

According to the disclosure, an exemplary inter-bay SA application for coordinated control or operation of primary devices can be implemented by automatically generating function instances and the necessary configuration data. A standardized configuration description of an exemplary SA system can be read or parsed in order to obtain the static topology of the substation as well as information about the primary devices. A coordination function block can be generated for application-wide control of the exemplary inter-bay SA application, including on/off, operation mode (test/simulation/run), or functional goal. This coordination function block can be assigned, in the standardized substation description, to an organizational coordination-level hierarchically located above a bay-level and corresponding to the above defined coordination range, for example to a voltage level, a substation level, or an inter-substation or network level. Interface function blocks for data or message exchange over a communication network of the exemplary SA system can be generated and assigned, in the standardized substation description, to a hierarchical interface-level that corresponds to a substation constituent being interfaced. Depending on the kind of substation constituent being referred to, for example, whether the data being exchanged refers to the substation, a voltage level of the substation, a bay, or an individual piece of primary equipment, the interface-level can correspond to a station level, a voltage level, a bay level, or a device level, respectively. In terms of IEC 61850, the generated function blocks correspond to Logical Node (LN) instances, which can be included in an enhanced Substation Configuration Description (SCD) file of the SA system and assigned or grouped to Logical Devices (LD) according to the structural levels as evidenced in the substation section of the SCD file.

The above steps can executed, upon request from an engineer, in an automated way by an SA application engineering tool, and may be repeated at any time, in particular during maintenance and extension of the exemplary SA system. Further implementation steps can be triggered, during operation of the exemplary SA system, for example, by an operator or by a changed dynamic topology following a switching action. For example, an application expert program, based on SCD external application logic or IEC 61131 code part, and based on the aforementioned interface definitions as included in an enhanced SCD, as well as optionally involving the dynamic substation topology as obtained from the SCD and actual switch states, can be executed. The results thereof can further be assigned to specific Data Objects in the interface LNs for subsequent transfer or download to various IEDs of the exemplary SA system.

In an exemplary embodiment of the disclosure, the interface-level function block can include control blocks and data set definitions that together define the data flow within the application, for example the communication links between the IED that hosts the interface function block and the IED hosting a basic SA functionality assigned to substation constituents on a hierarchically lower level. This data flow can be engineered automatically by a separate application engineering wizard, or a component of a system engineering tool.

In a further exemplary embodiment, in case of a centralized implementation, all application related function block instances can be hosted by a central IED, whereas in a decentralized implementation, distributed function blocks of all levels can be instantiated on several IEDs capable to perform the appropriate function block function. However, the disclosure can be independent of the physical distribution of the inter-bay SA application components. For example, the application may run completely isolated on a separate IED, or can be implemented in a distributed way on the already existing IEDs of the base SA system.

An exemplary aspect to fully automate inter-bay SA application configuration and implementation is the generation of the interface description of the inter-bay SA application to the rest of the SA system, for example to a bay controller, IED, OPC server, HMI, and/or gateway. According to this disclosure, a formal description or structure of the base SA system as for example, included in an IEC 61850 SCD file can be used to generate a formal description of the interfaces of the inter-bay SA application to be engineered, i.e. to structure the interface data into Logical Nodes according to IEC 61850. The latter can further be connected to the process single line diagram and integrated into the SCD file of the base SA system, thereby generating an enhanced SCD file. The link to the switch yard objects may be documented by appropriate naming of the LNs as well as in the substation section of the enhanced SCD file.

The interface LN types or classes including primary device related Data Objects can be instantiated per primary device as a function of the application, and the coordination function block or LN types related to the inter-bay functionality can be instantiated per coordination range. This might be once per substation grouping, per substation, or per voltage level as dictated by the application. The resulting enhanced SCD file with the additionally needed IEDs for the coordination-level function and the LN instances allocated to the switch yard objects can then be handled by an engineering wizard to complete any data flow definitions needed for the station level function. This can include specifying the basic data needed as input or command output to the switch yard objects, as well as the services, such as MMS or GOOSE, by which this data can be communicated.

In an exemplary embodiment of the disclosure, the enhanced SCD file can be converted by a configuration wizard into a more implementation-friendly format, like Boolean formulas for interlocking generated from the topology described in the SCD file, or another syntactical representation such as an array of elements for the computationally expensive single line data. This can be useful for a distributed implementation of the central functionality, where each part of the distributed function can be assigned its related configuration part.

The present disclosure also relates to a computer program product including computer program code for controlling one or more processors of a device adapted to be connected to a SA communication network, such as a computer program product including a computer readable medium containing therein the computer program code.

The following description of exemplary embodiments focuses on station level interlocking and switching sequences as two examples illustrating how this kind of station-level functionality can be automatically configured, if the basic SA functionality and its relation to the single line diagram as well as the single line diagram itself are described in a formal way, for example by an IEC 61850 SCD file. However, as mentioned, other station-level applications such as transformer parallel control, transformer auto close functions and load shedding likewise may benefit from the disclosure.

FIG. 1 depicts a single line diagram of an exemplary substation with a double bus bar configuration and three bays Q2, Q3, Q4. Each bay can include a circuit breaker QA1 and a number of switches QE3.

Figure 2:
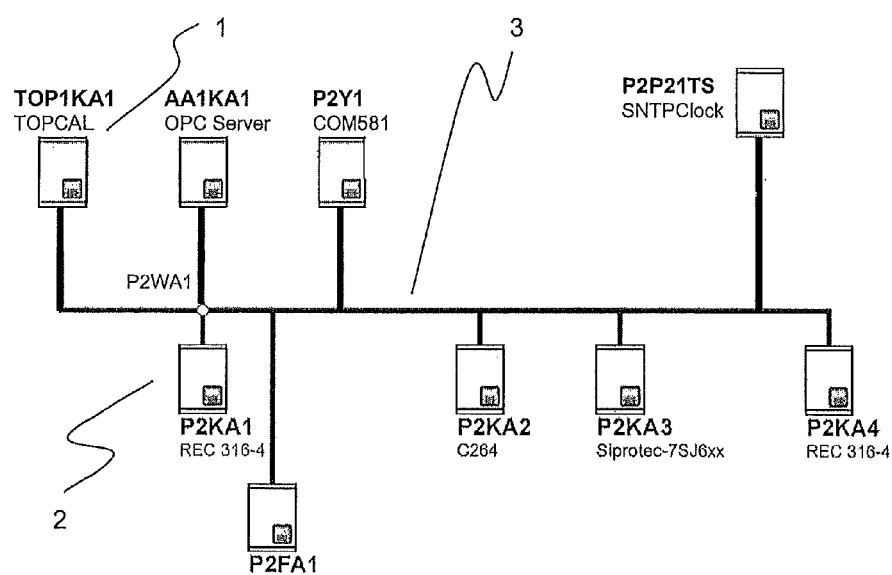
FIG. 2 depicts the corresponding exemplary SA system.

FIG. 2 shows a corresponding exemplary Substation Automation SA system for control of the substation according to FIG. 1, including central or station-level Intelligent Electronic Device IED 1 (designated TOP1KA1), bay IED 2 (designated P2KA1), and SA communication network 3.

Figure 3A:
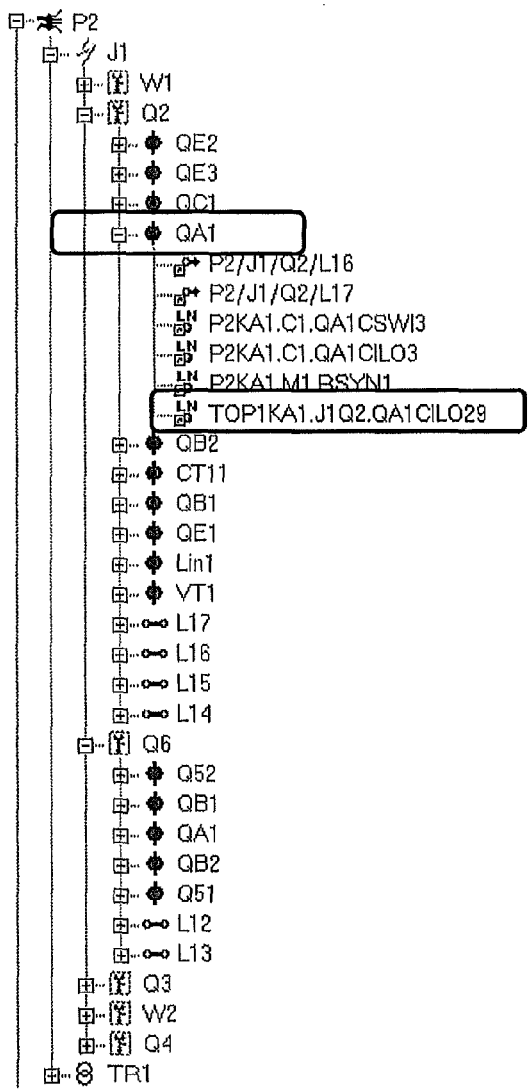
FIG. 3 visualizes excerpts of a corresponding SCD.
Figure 3B:
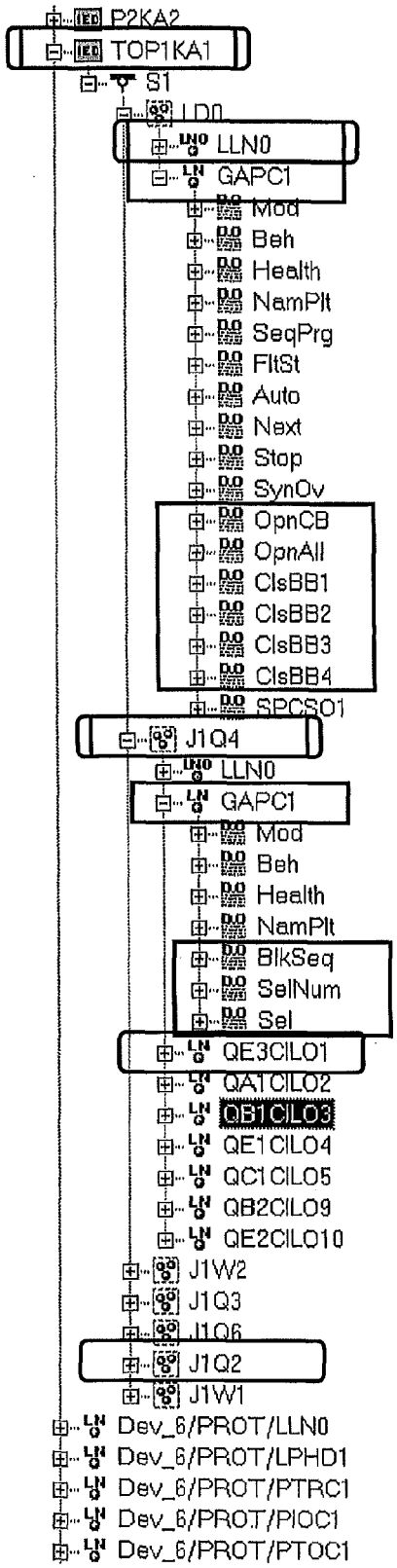
Figure 3C:
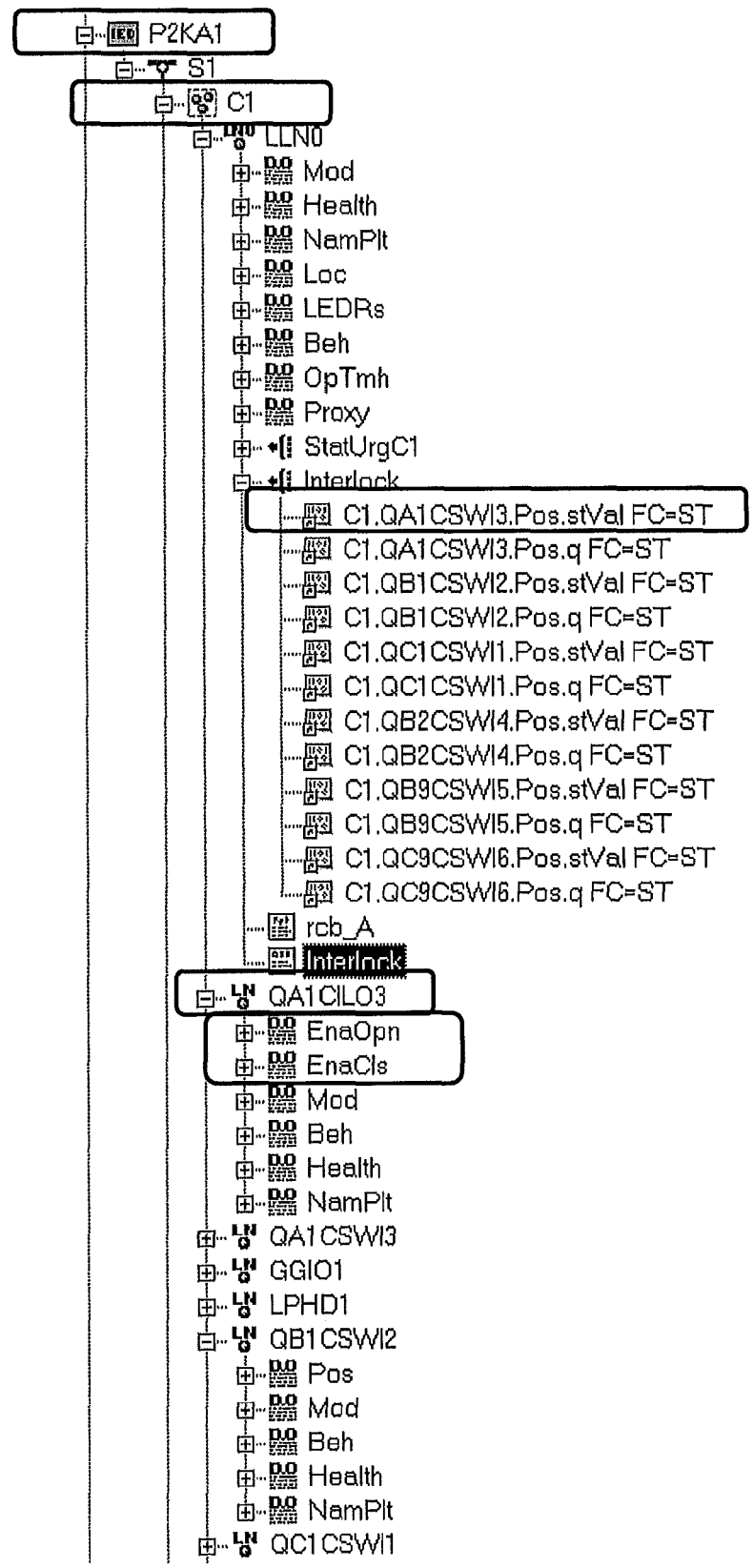

FIGS. 3a to 3c visualize excerpts of an enhanced Substation Configuration Description SCD of the exemplary SA system according to FIG. 2, in particular the substation section (FIG. 3a), a configuration of the central IED 1 (FIG. 3b), and a configuration of the bay IED 2 (FIG. 3c). The substation section lists the primary devices of a substation designated P2 and assigned to a single voltage level J1. The elements depicted in FIGS. 3a to 3c are surrounded by a rounded/ standard rectangle and referenced in the following description by rounded/square brackets in case they belong to the below mentioned first/second example, respectively.

A first example concentrates on a centralized station level interlocking, which can additionally include bay level interlocking functionality and can thus either be used as only central interlocking function, or as station level "add-on" to a bay level interlocking in the bay controllers.

For interlocking the IEC 61850 standard provides the Logical Node LN class CILO, which has to be instantiated for each switching device concerned. By parsing the SCD file substation section, all switches with a CSWI LN can be found and an instance of the CILO LN class can be added to each of these. This instance has also to be allocated to an IED. In case of central interlocking it can be allocated to a central IED (TOP1KA1). To manage the instance naming, the switch name QE3 is taken as CILO name prefix, the instance number can be equal to 1, and all instances (e.g. QE3CILO1) of one bay Q4 can be assigned to a Logical Device LD (J1Q4) related to this bay. This enables the operator to switch the station interlocking on and off per bay, for example by the Data Object DO "MOD" in the LLN0 of the J1Q4 (not expanded). Additionally a LD (designated LD0) can be created, which allows switching on/off the entire station level interlocking, for example by the DO "MOD" in the (LLN0) of the LD0 (not expanded). The signals or DOs belonging to each CILO LN can already be prepared in a CILO type definition, so that the instance definition in the SCD file just has to reference this type.

By way of example, for an exemplary controllable switch (QA1) in bay Q2 of voltage level J1 in substation P2
 an LD (J1Q2) can be created for the bay Q2 and allocated to the central IED (TOP1KA1),
 an LN instance QA1CILO29 of type MyStationLevelCilo can be assigned to this LD,
 and the LN instance (QA1CILO29) can also be allocated to the switch P2J1Q2QA1 in the substation section of the enhanced SCD (FIG. 3a).

As a functional configuration of the generated LN instance QA1CILO1, the application logic, for example the interlocking rules as referred to in U.S. Pat. No. 4,767,941, can be included in an interlock expert program together with the substation single line diagram and the CILO interface definitions from the enhanced SCD file.

During operation and, for example, when triggered by a changing switch position, the interlock expert program fetches the current switch states (QA1CSWI3.Pos) from the XCBR and XSWI LNs allocated to the switching devices, and derives the actual switch yard topology therefrom for a topological interlocking implementation. Based on the interlock expert rules a release pattern can be calculated, which is then made visible for the other IEDs via the generated interface LNs CILO (e.g., the results of the calculation can be assigned to the appropriate CILO DOs (EnaOpn, EnaCls) of the interface LNs).

These values can subsequently to be transferred to the IEDs (P2KA3) hosting the above interface-LN instance. This can be arranged for by an automated data flow generation as detailed in EP-A 1191662, the outcome of which being stored in IEC 61850 control blocks (Interlock) and data sets (Interlock) including the data items (C1.QA1CSWI3.Pos.stVal FC=ST) to be exchanged. This can likewise be included in the enhanced SCD, as partly depicted for IED P2KA1 in FIG. 3c for the case of bay level interlocking. For station-level interlocking, the communication stack of the central IED (TOP1KA1) hosting the control-level function LNs can then use the SCD communication definitions to distribute the calculated CILO states to the bay level IEDs.

By way of comparison, an exemplary Bus Bar Ring station-wide interlocking for switch QB2 of bay Q4 can result in a Boolean interlocking logic in single line notation as follows:

P2.J1.Q4.QB2BBRing:=P2.J1.Q4.QB1*
 (P2.J1.Q2.QB1*P2.J1.Q2.QB2+further terms).

which, following an automated data flow generation, translates into

P2KA3CTRL/QB2CILO1.BBRing:=P2KA3CTRL/
 Q1CSWI1*(P2KA1C1/QB1CSWI2*P2KA1C1/
 QB2CSWI4+further terms).

Here, one can appreciate that the LD P2KA1C1 can send DOs from LN QB1CSWI2 to the LD P2KA3CTRL. The intuitive naming convention for LN and LD in the foregoing example unambiguously enables the station level interlocking function to deduce the relation of its interface signals to the switch yard, based on the name alone. However, due to the allocation to the substation section also other, less intuitive naming conventions can be used as well.

A second example concentrates on a centralized switching sequence implementation, which can uses standard commands to change the state of switches as needed. Switching sequences shall lead to a specific functional goal like Bay isolated [OpnAll], Bay CBR open [OpnCB], Bay connected to bus bar N [CIsBBN], or Bay earthed. An operator must be able to select this goal, and to select the bay or bays to which it applies. This leads to a functional architecture with a central part, which allows to select the common goal for all bays to be handled and to control the running sequence, and to a part per bay, which allows to select a bay for the sequence [Sel], and additionally shows the state of this bay such as switching impossible, bay local state, blocked for sequences [BlkSeq] and so forth.

As IEC61850 has no standardized logical nodes for sequences, the generic function class GAPC can be used for both types of logical nodes. Alternatively private LN classes could be defined. The central functionality is put behind an instance GeneralGAPC1 of type GeneralSeqGAPC in the Logical Device LD LD0, which additionally hosts the logical node LLN0 to enable/disable the switching sequence application. Additionally there can be a logical device [J1Q4] per bay, which hosts the bay related function part in an instance BayGAPC1 of the LN type BaySeqGAPC, containing data objects [BlkSeq, Sel] showing if the bay is blocked for sequences, and allowing to select the bay for a sequence. As evidenced in FIG. 3b, all function blocks of the centralized switching sequence application can be hosted by the central IED [TOP1KA1].

Again, and or all of these instances can be created by parsing the substation section of the SCD file, thus finding all bays of all the substations to be handled by the sequencer, and instantiating the appropriate LN instances. Thus, for bay Q2 in voltage level J1 of substation P2, a logical device P2J1Q2 is created, and a logical node instance BayGAPC1 of LN type BaySeqGAPC in it.

A topology based sequencer implementation then can be completed by reading, by a sequencer expert program, the enhanced SCD file. From the substation section it deducts the switch yard topology, and finds the switch state data objects of all bays related to the switch yard as well as the data objects needed to control the switches. It knows via which data objects of the Bayname/BayGAPC1 instances it receives the select requests for a bay, and then it can get the goal and sequence start command via the LD0/GeneralGAPC1 logical node to run the sequence. From the switch yard topology, which is also used to calculate the bay types and thus determines their basic handling, and from the goal it calculates the sequence steps, and then executes these steps one by one, using the CSWI logical nodes allocated to the switches of a bay to supervise the progress and command the next step.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of Designations
1 station-level IED
2 bay IED
3 SA communication network

What is claimed is:

1. A method of implementing an inter-bay substation automation SA application involving primary devices arranged in a plurality of substation bays of a substation, comprising:
 reading a standardized configuration description of an SA system of a substation, and obtaining therefrom a static topology of the substation as well as primary device information;
 generating a coordination function block for control of the inter-bay SA application, and assigning, in the standardized configuration description of the SA system, the coordination function block to a coordination-level above a bay level, wherein the coordination-level is one of a voltage level or a substation level;
 generating an interface function block for exchanging, over an SA communication network, data related to a substation constituent; and
 assigning, in the standardized configuration description of the SA system, the interface function block to an interface-level respective of the substation constituent.

2. The method according to claim 1, wherein the interface-level is one of a station level, a voltage level, a bay level, or a device level.

3. The method according to claim 1, comprising:
 engineering, based on an enhanced standardized configuration description of the SA system including the generated interface function blocks, application related communication flow between intelligent electronic devices (IEDs) of the SA system.

4. The method according to claim 1, comprising:
 generating a plurality of coordination function blocks for control of the inter-bay SA application; and
 distributing the plurality of coordination function blocks on a plurality of intelligent electronic devices.

5. An intelligent electronic device IED of a substation automation SA system, for connecting to an SA communication network for data exchange with other IEDs, and hosting, comprising:
 a coordination function block (LLN0, GAPC1) for control of an inter-bay SA application involving primary devices arranged in a plurality of substation bays, the coordination function block being assigned, in a standardized configuration description of the SA system, to a coordination-level above a bay level; and
 an interface function block for exchanging, over the SA communication network, data related to a substation constituent, the interface function block being assigned, in the standardized configuration description of the SA system, to an interface-level respective of the substation constituent.

6. The method according to claim 1, wherein the inter-bay SA application is one of centralized switching sequence, transformer parallel control, transformer auto close, and load shedding.

* * * * *